US011624838B2

(12) United States Patent
Fine et al.

(10) Patent No.: US 11,624,838 B2
(45) Date of Patent: Apr. 11, 2023

(54) SYSTEM AND METHOD FOR PROVIDING GNSS CORRECTIONS

(71) Applicant: Swift Navigation, Inc., San Francisco, CA (US)

(72) Inventors: Mark Fine, San Francisco, CA (US); Benjamin Lipeles Segal, San Francisco, CA (US); Fergus MacPherson Noble, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 17/379,271

(22) Filed: Jul. 19, 2021

(65) Prior Publication Data
US 2022/0018969 A1 Jan. 20, 2022

Related U.S. Application Data

(60) Provisional application No. 63/053,387, filed on Jul. 17, 2020.

(51) Int. Cl.
*G01S 19/07* (2010.01)
*G01S 19/25* (2010.01)
(Continued)

(52) U.S. Cl.
CPC .......... *G01S 19/073* (2019.08); *G01S 19/243* (2013.01); *G01S 19/256* (2013.01); *G01S 19/27* (2013.01); *G01S 19/30* (2013.01)

(58) Field of Classification Search
CPC .... G01S 19/073; G01S 19/243; G01S 19/256; G01S 19/27; G01S 19/30
(Continued)

(56) References Cited

U.S. PATENT DOCUMENTS

| 5,610,614 A | 3/1997 | Talbot et al. |
| 6,427,122 B1 | 7/2002 | Lin |

(Continued)

FOREIGN PATENT DOCUMENTS

| CA | 2718988 C | 1/2014 |
| CA | 3079279 A1 | 10/2020 |

(Continued)

OTHER PUBLICATIONS

Ko, Jonathan , et al., "GP-UKF: Unscented kalman filters with Gaussian process prediction and observation models", Conference Paper, Dec. 2007, 10.1109/IROS.2007.4399284.

(Continued)

*Primary Examiner* — Vladimir Magloire
*Assistant Examiner* — Alexander L. Syrkin
(74) *Attorney, Agent, or Firm* — Jeffrey Schox; Randy Mehlenbacher

(57) ABSTRACT

A system or method for generating or distributing GNSS corrections can include or operate to: generate a set of corrections based on satellite observations, wherein each correction of the set of corrections comprises an area associated with the correction, a tag, and correction data; update a set of stored corrections with the set of received corrections based on a tag associated with each correction of the set of stored corrections and the tag associated with each correction of the set of received corrections; and transmit stored corrections of the set of stored corrections to the GNSS receiver when the area associated with the stored corrections matches the locality of the GNSS receiver.

18 Claims, 9 Drawing Sheets

(51) Int. Cl.
   *G01S 19/30* (2010.01)
   *G01S 19/24* (2010.01)
   *G01S 19/27* (2010.01)

(58) Field of Classification Search
   USPC .......................................................... 342/352
   See application file for complete search history.

(56) References Cited

U.S. PATENT DOCUMENTS

| | | |
|---|---|---|
| 6,453,237 B1 | 9/2002 | Fuchs et al. |
| 6,552,680 B1 * | 4/2003 | Barber ................... G01S 19/40 |
| | | 342/357.44 |
| 6,647,340 B1 * | 11/2003 | Pemble ................... G01S 19/08 |
| | | 340/992 |
| 6,691,066 B1 | 2/2004 | Brodie |
| 6,816,117 B2 | 11/2004 | Fink et al. |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,298,325 B2 | 11/2007 | Krikorian et al. |
| 7,382,313 B1 | 6/2008 | Goad |
| 7,696,922 B2 | 4/2010 | Nicholson et al. |
| 8,089,402 B2 | 1/2012 | Maenpa et al. |
| 8,094,065 B2 | 1/2012 | Henkel |
| 8,193,976 B2 | 6/2012 | Shen et al. |
| 8,416,133 B2 | 4/2013 | Hatch et al. |
| 8,587,475 B2 | 11/2013 | Leandro |
| 8,610,624 B2 | 12/2013 | Savoy |
| 8,760,343 B2 | 6/2014 | Milyutin et al. |
| 8,825,456 B2 | 9/2014 | Vasudevan et al. |
| 9,069,073 B2 | 6/2015 | Ramakrishnan et al. |
| 9,128,176 B2 | 9/2015 | Seeger |
| 9,405,012 B2 | 8/2016 | Doucet et al. |
| 9,417,330 B2 | 8/2016 | Revol et al. |
| 9,557,422 B1 | 1/2017 | Miller et al. |
| 9,784,844 B2 | 10/2017 | Kana et al. |
| 9,857,474 B2 | 1/2018 | Tan et al. |
| 9,927,530 B2 | 3/2018 | Boyarski |
| 10,101,464 B2 | 10/2018 | Appleford et al. |
| 10,260,888 B2 | 4/2019 | Takahashi |
| 10,274,606 B1 | 4/2019 | Phan et al. |
| 10,422,885 B2 | 9/2019 | Dai et al. |
| 10,677,933 B1 | 6/2020 | Gavrilets et al. |
| 10,802,160 B2 | 10/2020 | Dai et al. |
| 10,809,388 B1 | 10/2020 | Carcanague et al. |
| 10,901,096 B2 | 1/2021 | Thrasher et al. |
| 11,156,718 B2 | 10/2021 | Takeda |
| 11,327,182 B2 | 5/2022 | Zalewski et al. |
| 11,422,269 B2 | 8/2022 | Ookubo et al. |
| 2002/0180641 A1 | 12/2002 | Fink et al. |
| 2005/0001762 A1 | 1/2005 | Han et al. |
| 2005/0024263 A1 | 2/2005 | Sharpe et al. |
| 2007/0126629 A1 | 6/2007 | Krikorian et al. |
| 2008/0205521 A1 | 8/2008 | Van Der Vleuten |
| 2009/0018772 A1 | 1/2009 | Watanabe et al. |
| 2009/0184869 A1 | 7/2009 | Talbot et al. |
| 2009/0273511 A1 | 11/2009 | Schroth |
| 2010/0164789 A1 | 7/2010 | Basnayake |
| 2010/0283675 A1 | 11/2010 | Mcaree et al. |
| 2011/0050497 A1 | 3/2011 | Maenpa et al. |
| 2011/0148698 A1 | 6/2011 | Vollath |
| 2011/0187589 A1 | 8/2011 | Gaal et al. |
| 2011/0187590 A1 | 8/2011 | Leandro |
| 2011/0316740 A1 | 12/2011 | Waters et al. |
| 2012/0154210 A1 | 6/2012 | Landau et al. |
| 2012/0176271 A1 | 7/2012 | Dai et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0335264 A1 | 12/2013 | Revol et al. |
| 2014/0015712 A1 | 1/2014 | Leandro et al. |
| 2014/0184442 A1 | 7/2014 | Large et al. |
| 2014/0240172 A1 | 8/2014 | Milyutin et al. |
| 2014/0266876 A1 | 9/2014 | Tan et al. |
| 2015/0019464 A1 | 1/2015 | Nguyen-Tuong et al. |
| 2015/0260848 A1 | 9/2015 | Mundt et al. |
| 2015/0270615 A1 | 9/2015 | Neenan |
| 2015/0293233 A1 | 10/2015 | De Jong |
| 2015/0369924 A1 | 12/2015 | Hedgecock et al. |
| 2016/0097859 A1 | 4/2016 | Hansen et al. |
| 2016/0195617 A1 | 7/2016 | Phatak et al. |
| 2017/0269216 A1 | 9/2017 | Dai et al. |
| 2017/0269222 A1 | 9/2017 | Dai et al. |
| 2017/0269231 A1 | 9/2017 | Dai et al. |
| 2017/0299730 A1 | 10/2017 | Lie et al. |
| 2017/0299731 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0164442 A1 | 6/2018 | Thrasher et al. |
| 2018/0246217 A1 | 8/2018 | Wuebbena |
| 2018/0252818 A1 | 9/2018 | Sato et al. |
| 2019/0004180 A1 | 1/2019 | Jokinen |
| 2019/0154837 A1 | 5/2019 | Noble et al. |
| 2019/0187298 A1 | 6/2019 | Grgich et al. |
| 2019/0204450 A1 | 7/2019 | Revol |
| 2019/0243001 A1 | 8/2019 | Ookubo et al. |
| 2019/0339396 A1 | 11/2019 | Turunen |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0096649 A1 | 3/2020 | Brandl et al. |
| 2020/0209406 A1 | 7/2020 | Lin et al. |
| 2020/0233056 A1 | 7/2020 | Dolgov et al. |
| 2021/0033735 A1 * | 2/2021 | Kleeman ................. G01S 19/40 |
| 2021/0165104 A1 | 6/2021 | Zalewski et al. |
| 2021/0165111 A1 | 6/2021 | Zalewski |
| 2021/0215831 A1 | 7/2021 | Takeda |
| 2022/0058322 A1 | 2/2022 | Brandl et al. |
| 2022/0163677 A1 | 5/2022 | Muthuraman et al. |

FOREIGN PATENT DOCUMENTS

| | | |
|---|---|---|
| CN | 101166995 A | 4/2008 |
| CN | 103197327 A | 7/2013 |
| CN | 103760573 A | 4/2014 |
| CN | 104236522 A | 12/2014 |
| CN | 106970404 A | 7/2017 |
| CN | 105629263 B | 4/2019 |
| CN | 107422354 B | 6/2019 |
| CN | 114174850 A | 3/2022 |
| EP | 0244091 A2 | 11/1987 |
| EP | 2602752 A1 | 6/2013 |
| EP | 1839070 B2 | 4/2014 |
| EP | 3627188 A1 | 3/2020 |
| EP | 3566021 B1 | 3/2021 |
| KR | 101181990 B1 | 9/2012 |
| WO | 2017046914 A1 | 3/2017 |
| WO | 2017070732 A1 | 5/2017 |
| WO | WO-2020240307 A1 * | 12/2020 ............. G01S 19/04 |

OTHER PUBLICATIONS

Bruno, Jon, et al., "A realistic simulation framework to evaluate ionospheric tomography", Advances in Space Research 65 (2020) 891-901.

"Swift Navigation Binary Protocol", Version 3.4.5, Mar. 10, 2021, pp. 1-156.

Rothacher, M., et al., "ANTEX: the Antenna Exchange Format, Version 1.4", Sep. 15, 2010, IGC International GNSS Service, https://kb.igs.org/hc/en-us/articles/216104678-ANTEX-format-description.

Schmid, R., et al., "Estimation of elevation-dependent satellite antenna phase center variations of GPS satellites", Journal of Geodesy (2003) 77: 440-446, May 19, 2003, DOI 10.1007/s00190-003-0339-0.

(56) References Cited

OTHER PUBLICATIONS

Schmid, Ralf, et al., "From Relative Absolute Antenna Phase Center Corrections", Conference: IGS Workshop and Symposium 2004.
Schmid, Ralf, "How to Use IGS Antenna Phase Center Corrections", GPS World Tech Talk, Feb. 3, 2010.
Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.
Titsias, Michael K., "Variational Learning of Inducing Variables in Sparse Gaussian Processes", http://proceedings.mlr.press/v5/titsias09a/titsias09a.pdf, 2009.
"RAIM", GMV, 2011, RAIM.
International Search Report and Written Opinion for PCT Application No. PCT/US20/44750dated Jan. 8, 2021.
International Search Report and Written Opinion for PCT Application No. PCT/US20/31137 dated Sep. 4, 2020.
"An Introduction to GNSS, Chapter 4, GNSS Error Sources", https://novatel.com/an-introduction-to-gnss/chapter-4-gnsserror-sources, published 2015.
"Geo++ SSR for Network-RTK, PPP and PPP-RTK", https://geopp.de/wp-content/uploads/2020/09/SSR_Flyer_v3.pdf.
"IGS State Space Representation (SSR) Format Version 1.00", International GNSS Service (IGS), Oct. 5, 2020.
"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.
"Safe Position Augmentation for Real-Time Navigation (SPARTN) Interface Control Document Version 1.8.0", Jan. 2020, Sapcorda Services GmbH.
Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.
Blanch, Juan, et al., "RAIM with Optimal Integrity and Continuity Allocations Under Multiple Failures", IEEE Transactions on Aerospace and Electronic Systems, vol. 46, No. 3, Jul. 2010.
Brocard, Philippe, "Integrity monitoring for mobile users in urban environment", https://tel.archives-ouvertes.fr/tel-01379632/document, submitted Oct. 11, 2016.
Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.
Chiu, David S., et al., "Bierman-Thorton UD Filtering for Double-Differenced Carrier Phase Estimation Accounting for Full Mathematical Correlation", Jan. 2008, ION NTM 2008, pp. 756-762., 2017-06-2300:00:00.0.
Feng, Shaun, et al., "Carrier phase-based integrity monitoring for high-accuracy positioning", GPS Solution, Apr. 2009.
Gratton, Livio, et al., "Carrier Phase Relative RAIM Algorithms and Protection Level Derivation", Journal of Navigation (2010), 63, 215-231, doi: 10.1017/S0373463309990403.
Gunning, Kazuma, et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.
Hirokawa, Dr. Rui, "Recent Activity of International Standardization for High-Accuracy GNSS Correction Service", Mitsubishi Electric, Jun. 27, 2019.
Huang, Panpan, "Airborne GNSS PPP Based Pseudolite System", School of Civil and Environmental Engineering Faculty of Engineering UNSW. Jun. 2019.
Karaim, Malek, et al., "GNSS Error Sources", https://www.intechopen.com/books/multifunctional-operation-and-application-of-gps/gnss-error-sources, published Apr. 6, 2018.

Khanafseh, Samer, et al., "GNSS Multipath Error Modeling for Automotive Applications", Abstract only, Proceedings of the 31st International Technical Meeting of the Satellite Division of The Institute of Navigation (ION GNSS+2018), Miami, Florida, Sep. 2018, pp. 1573-1589, https://www.ion.org/publications/abstract.cfm?articleID=16107.
Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.
Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.
Lei, Yu, et al., "Prediction of Navigation Satellite Clock Bias by Gaussian Process Regression", Lecture Notes in Electrical Engineering 342:411-423, Jan. 2015.
Li, T., et al., "Some remarks on GNSS integer ambiguity validation methods", Survey Review, Dec. 5, 2012, vol. 44, No. 326.
Lin, Ming, et al., "Robust Gaussian Process Regression for Real-Time High Precision GPS Signal Enhancement", www.gps.gov/systems/gps/performance/accuracy, Jun. 5, 2019.
Liu, Haiying, et al., "A closed-loop EKF and multi-failure diagnosis approach for cooperative GNSS positioning", Engineering, GPS Solutions, Published 2015.
Madrid, Navarro, et al., "New Approach for Integrity Bounds Computation Applied to Advanced Precise Positioning Applications", Proceedings of the 28th International Technical Meeting of the Satellite Division of The nstitute of Navigation (ION GNSS+ 2015) Sep. 14-18, 2015, Tampa Convention Center, Tampa, Florida.
Odijk, Dennis, et al., "On the estimability of parameters in undifferenced, uncombined GNSS network and PPP-RTK user models by means of S-system theory", Journal of Geodesy, Nov. 2015.
Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.
Pervan, Boris, et al., "Shaping Aviation Integrity Two RAIMs for Safety", GPS World The Business and Technology of Global Navigation and Positioning, Apr. 1, 2008.
Phelts, R. Eric, et al., "Innovation: Improving ARAIM, an approach using precise point positioning", GPS World, Jun. 13, 2020, https://www.gpsworld.com/innovation-improving-araim/.
Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.
Rasmussen, C.E., et al., "Gaussian Processes for Machine Learning", MIT Press, 2006, ISBN 026218253X. c 2006 Massachusetts Institute of Technology, (Year: 2006).
Satirapod, Chalermehon, "Improving the GPS Data Processing Algorithm for Precise Static Relative Positioning", School of Surveying and Spatial Information Systems The University of New South Wales. Jan. 2002.
Schmitz, Martin, "RTCM State Space Representation Messages, Status and Plans", PPP-RTK & Open Standards Symposium, Mar. 12-13, 2012, Frankfurt, Germany.
Snelson, Edward, et al., "Sparse Gaussian Process using Pseudo-inputs", NIPS'05: Proceedings of the 18th International Conference on Neural Information Processing Systems, Dec. 2005, pp. 1257-1264.
Subirana, J. Sanz, et al., "Carrier Phase Cycle-Slip Detection—Navipedia", https://gssc.esa.int/navipedia/index.php/Carrier_Phase_Cycle-Slip_Detection, published 2011.
Takasu, Tomoji, et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.

(56) References Cited

OTHER PUBLICATIONS

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation a Framework for GNSS Ambiguity Acceptance Testing", InsideGNSS, Mar./Apr. 2011, pp. 66-73, www.insidegnss.com.

Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Urquhart, Landon, et al., "Innovation: Integrity for safe navigation", https://www.gpsworld.com/innovation-integrity-for-safe-navigation-provided-by-gnss-service/, GPS World, Feb. 12, 2020.

Van Diggelen, Frank, et al., "Google to improve urban GPS accuracy for apps", Dec. 9, 2020, Android Developers Blog.

Van Graas, Frank, et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.

Waserman, Eyal, et al., "A Mixed Integer Least-Squares Formulation of the GNSS Snapshot Positioning Problem", https://github.com/eyalw711/snapshot-positioning, Jun. 2, 2021.

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.

Zhu, Ni, et al., "GNSS Position Integrity in Urban Environments: a Review of Literature", IEEE Transactions on Intelligent Transportation Systems, 2018, 17p., 10.1109/TITS.2017.2766768.hal-01709519.

"Integrity-Navipedia", https://gssc.esa.int/navipedia/index.php/Integrity, published 2011.

Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.

\* cited by examiner

US 11,624,838 B2

SYSTEM AND METHOD FOR PROVIDING GNSS CORRECTIONS

CROSS-REFERENCE TO RELATED APPLICATIONS

This application claims the benefit of U.S. Provisional Application No. 63/053,387, filed 17 Jul. 2020, which is incorporated in its entirety by this reference.

TECHNICAL FIELD

This invention relates generally to the satellite positioning field, and more specifically to a new and useful system and method in the satellite positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
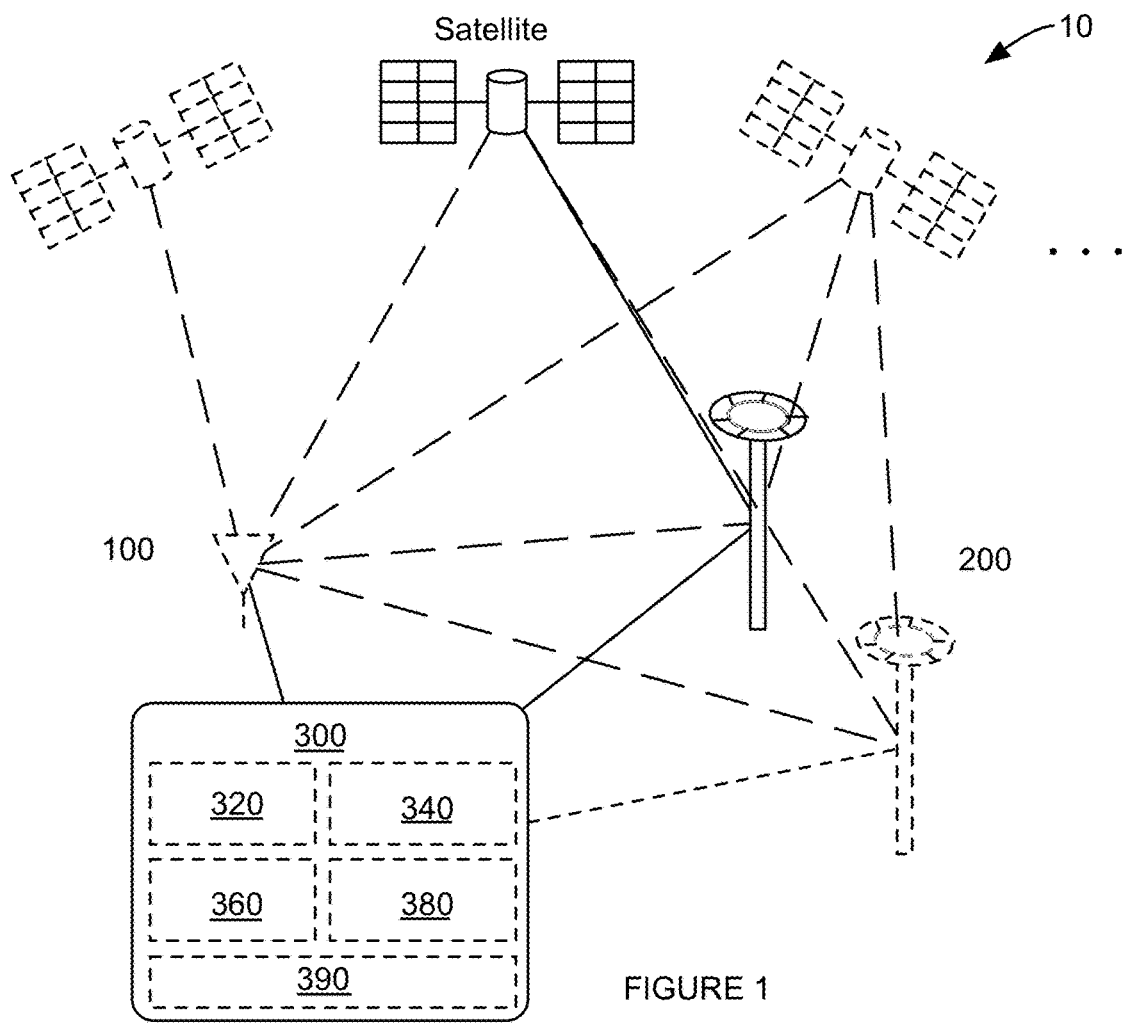
FIG. 1 is a schematic representation of the system.

As shown in FIG. 1, the system 10 can include a computing system 300, one or more receivers 100, and one or more reference stations 200. The computing system can include a correction generator 320, a gateway 340, a storage module 360, a distribution module 380, a positioning module 390, and/or any suitable modules or components. The distribution module preferably functions to distribute (e.g., transmit) GNSS corrections to the GNSS receiver.

Figure 2:
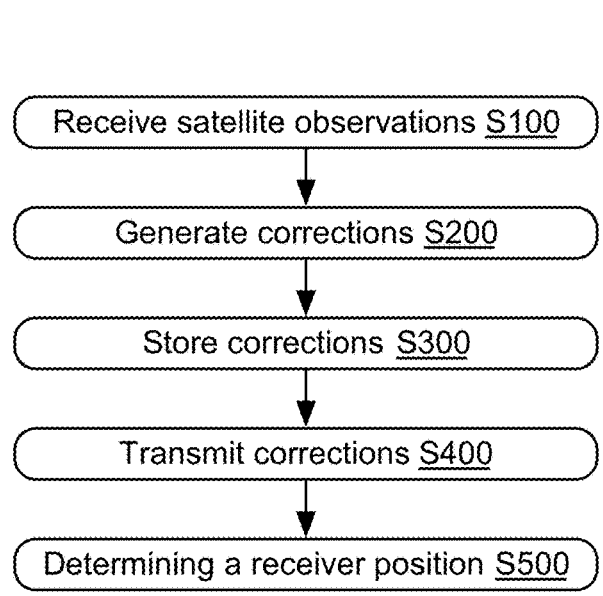
FIG. 2 is a schematic representation of the method.

As shown in FIG. 2, the method 20 can include receiving a set of satellite observations S100, determining GNSS corrections S200, storing the GNSS corrections S300, transmitting the GNSS corrections S400. The method can optionally include determining a receiver position S500 and/or any suitable steps.

The system and method preferably function to generate and transmit GNSS corrections to one or more GNSS receivers. Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system.

However, the system and/or method can additionally or alternatively be used to transmit any suitable data to one or more endpoint.

2. Benefits.

Variations of the technology can confer several benefits and/or advantages.

First, variants of the technology can ensure that a GNSS receiver only receives GNSS corrections that are relevant for that receiver to determine its position. By only receiving relevant GNSS corrections, the bandwidth required to transmit corrections can be decreased and/or the speed at which GNSS corrections are received can be increased. Specific examples of the technology can ensure only relevant GNSS corrections are transmitted by storing a cache of updated GNSS corrections and transmitting only the GNSS corrections that have been updated, by providing GNSS corrections that correspond to a GNSS receiver locality (e.g., an approximate GNSS receiver location such as within or less than 0.1 km, 1 km, 10 km, 100 km, etc.; within a given country or other geographic space; etc.), and/or by otherwise providing GNSS corrections based on metadata associated with the GNSS receiver.

Second, variants of the technology can ensure that GNSS corrections can be used with the GNSS receiver they are sent to. In specific examples, a message broker can format the GNSS corrections transmitted to the GNSS receiver so that the receiver can use the corrections.

Third, variants of the technology resolve SSR issues. First, tagging corrections with a tag (e.g., serial identifier) identifies the most recent correction (of a given type) to use, resolving issues stemming from asynchronous correction type updates. The tagging can also resolve receiver connectivity issues, and identify lost or dropped corrections. Second, this allows the corrections to be broadcast instead of retrieved by the receiver, which resolves corrections versioning issues arising from SSR's one-directional nature.

However, variants of the technology can confer any other suitable benefits and/or advantages.

3. System.

The system preferably functions to generate GNSS corrections which can be used to improve (e.g., speed up, increase the accuracy of, increase the integrity of, etc.) the determination of a GNSS receiver position.

The system preferably uses a set of data collected by one or more data sources. Data sources can include: receivers, sensors (e.g., located onboard the receiver, the external system, the reference stations, etc.), databases, satellites, reference stations, and/or any other suitable data source. The set of data preferably corresponds to a set of satellite observations, but can additionally or alternatively include a set of sensor observations or other data.

The set of satellite observations can include orbital data, timestamp, code data, carrier phase data, pseudocode data, and/or any suitable data. The set of satellite observations can include and/or be associated with metadata (e.g., ephemeris data) and/or any suitable data or information. The set of satellite observations preferably includes satellite observations corresponding to satellites from a plurality of satellite constellations (e.g., Global Positioning System (GPS), GLObal Navigation Satellite System (GLONASS), BeiDou navigation satellite System (BDS), Galileo, Navigation with Indian Constellation (NavIC), Quasi-Zenith Satellite System (QZSS), etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data.

The receiver(s) 100 preferably functions to receive a set of satellite observations (e.g., satellite signals such as carrier phase and satellite code) from one or more satellites. In variants, the receiver can determine the location of the receiver (and/or external system) based on the satellite observations. The receiver is preferably in communication with the computing system. However, the receiver can be integrated with the computing system, and/or the receiver and computing system can be arranged in any suitable manner. The receiver is preferably a stand-alone device (e.g., a GNSS receiver, antenna). However, the receiver can be integrated into an external system (e.g., be a component of an automobile, aero vehicle, nautical vehicle, mobile device, etc.), can be a user device (e.g., smart phone, laptop, cell phone, smart watch, etc.), and/or can be configured in any suitable manner.

In variants of the system including more than one receiver, each receiver can be configured to receive satellite observations corresponding to a satellite constellation, to a carrier frequency (e.g., the L1, L2, L5, E1, E5a, E5b, E5ab, E6, G1, G2, G3, B1, B2, B3, LEX, etc. frequencies), and/or corresponding to any suitable source.

The reference station(s) 200 preferably function to receive a set of satellite observations (e.g., reference station satellite observations) and transmit the reference station satellite observations to the computing system (and/or to the receiver). The satellite observations from the reference station(s) can be used to determine corrections (e.g., local and/or spatially invariant corrections such as to account for atmospheric effects, to account for clock errors, etc.) to the set of satellite observations corresponding to the receiver. Each reference station is preferably communicably coupled to the computing system. However, the reference station can include the computing system and/or be coupled to the computing system in any suitable manner. The reference stations can be in communication with the receiver. The reference station(s) are preferably located within about 500 km of the receiver(s), but the distance between the reference stations and the receiver(s) can be any distance.

The reference station satellite observations can correspond to the same and/or a different set of satellites as the set of satellite observations received by the receiver. However, the reference station satellite observations can correspond to any suitable satellite observations.

The location (e.g., position) of the reference station(s) is preferably known to a high degree of accuracy (e.g., less than 1 mm, 1 cm, 1 dm, 1 m, etc. of uncertainty in the location of the reference station). The location of the reference station(s) can be static and/or dynamic.

The computing system preferably functions to generate GNSS corrections, update the GNSS corrections, determine and/or associate metadata with the GNSS corrections, and transmit the GNSS corrections to the receiver(s). However, the computing system can generate and/or process any suitable data and/or perform any function. The computing system is preferably coupled to the receiver(s) and/or the reference station(s). The computing system can be local (e.g., to a receiver, to a reference station, etc.), remote (e.g., server, cloud, etc.), and/or distributed (e.g., between a local computing system and a remote computing system).

The GNSS corrections are preferably used to correct one or more satellite observations. The GNSS corrections can be associated with (e.g., correspond to) individual satellites, sets of satellites, satellite constellations, satellite frequencies, every satellite, reference stations, and/or to any data source. The GNSS corrections are preferably state space representations (SSR), but can be observation space representations (OSR), and/or in any representation. The GNSS corrections can include spatially variant corrections (e.g., local corrections, atmospheric corrections such as to correct for ionosphere delay, troposphere delays, ionosphere gradient, etc.), spatially invariant corrections (e.g., global corrections, satellite clock, satellite bias, satellite orbit, reference station clock, reference station bias, etc.), static corrections, and/or any corrections. The GNSS corrections can be associated with a validity period, wherein the corrections can be invalid outside of the validity period (e.g., and must be refreshed or updated), permanently valid, valid until an updated GNSS correction is generated, and/or otherwise valid.

The GNSS corrections can include RTK corrections, PPP corrections, PPP-RTK corrections, SBAS corrections, and/or any suitable corrections. The format of the GNSS corrections can be ASCII, binary, and/or another format. Examples of supported formats include: RTCM, SPARTN, CLAS, LPP, NCT, CMR, CMR+, CMRX, RTX, TSIP, NMEA, RINEX, BINEX, NTRIP, SP3, and/or other protocols and formats.

Figure 4:
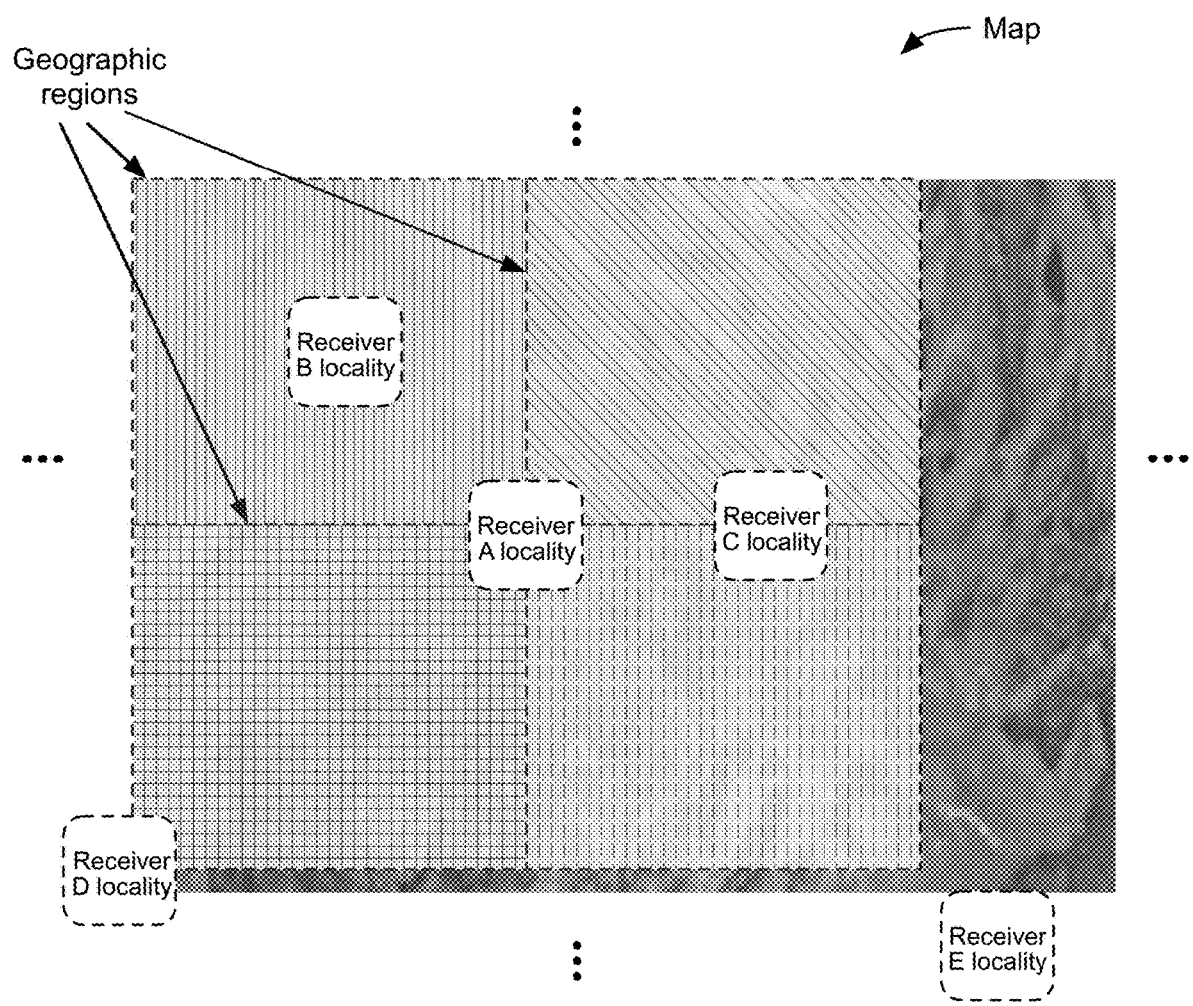
FIG. 4 is a schematic representation of an example of corrections associated with different regions where each color corresponds to a different GNSS correction.

The GNSS corrections are preferably associated with (e.g., correspond to, are valid within, are determined with, etc.) a correction region (e.g., tile(s), as shown for example in FIG. 4, etc.), where the GNSS corrections are valid within (and/or determined within) the correction region. The correction region can be a predetermined region, a region based on the receiver, a region based on the application, a region based on the receiver and/or corrections user, a region based on the reference station user, and/or any suitable region. As shown for example in FIG. 5A, the correction region can be defined by a pair of latitude and longitude coordinates. However, the correction region can be defined using an earth-centered, earth-fixed ECEF cartesian coordinate system; using map coordinates (e.g., projected onto a plane); using a geocode; relative to a landmark; relative to geographic regions; relative to or based on settlements (e.g., towns, cities, villages, etc.); relative to or based on geopolitical entities (e.g., states, cities, counties, municipalities, countries, etc.); and/or can be defined in any manner. However, the GNSS corrections can be valid at specific locations, globally valid, and/or otherwise valid.

The area or size of the geographic region can be about 0.01°-100° (e.g., 0.01°-10, 0.10-5°, 1°-30, 1°-100, 2°-5°, 5°-10°, 4.5°-5.5°, 5°, 4°, 3°, 2°, 1°, etc. latitude and/or longitude), an extent smaller than 0.1° (latitude or longitude), an extent greater than 10°, an extent between 10 km and 750 km (e.g., 10-500 km, 25-100 km, 50-250 km, 100-300 km, 10 km, 25 km, 50 km, 100 km, 200 km, 500 km, etc.), less than about 10 km, an extent greater than about 750 km, and/or any suitable size.

In an illustrative example, the GNSS corrections can be associated with a geographic region as disclosed in U.S. patent application Ser. No. 17/374,523, titled "SYSTEM AND METHOD FOR DETERMINING GNSS POSITIONING CORRECTIONS" filed 13 Jul. 2021, which is incorporated in its entirety by this reference.

The GNSS corrections can be updated (e.g., at a predetermined time such as based on the type of correction, the intended application, the external system, the target receiver position accuracy, target receiver position integrity, etc.) and/or fixed. The corrections can be updated at predetermined times (e.g., 1 s, 5 s, 10 s, 30 s, 60 s, 2 min, 5 min, 10 min, 20 min, 30 min, 60 min, 2 hr, 4 hr, 8 hr, 12 hr, 24 hr, etc.), responsive to a trigger (e.g., change in weather, change in temperature, change in receiver position, change in satellites in view of the receiver, etc.), manually (e.g., responsive to a user request for updated corrections), and/or with any suitable timing. Different GNSS correction types can be generated at or for the same or different time (e.g., a full correction set can be generated for an epoch, for different timeframes, at the same time, at different times, etc.).

Figure 6:
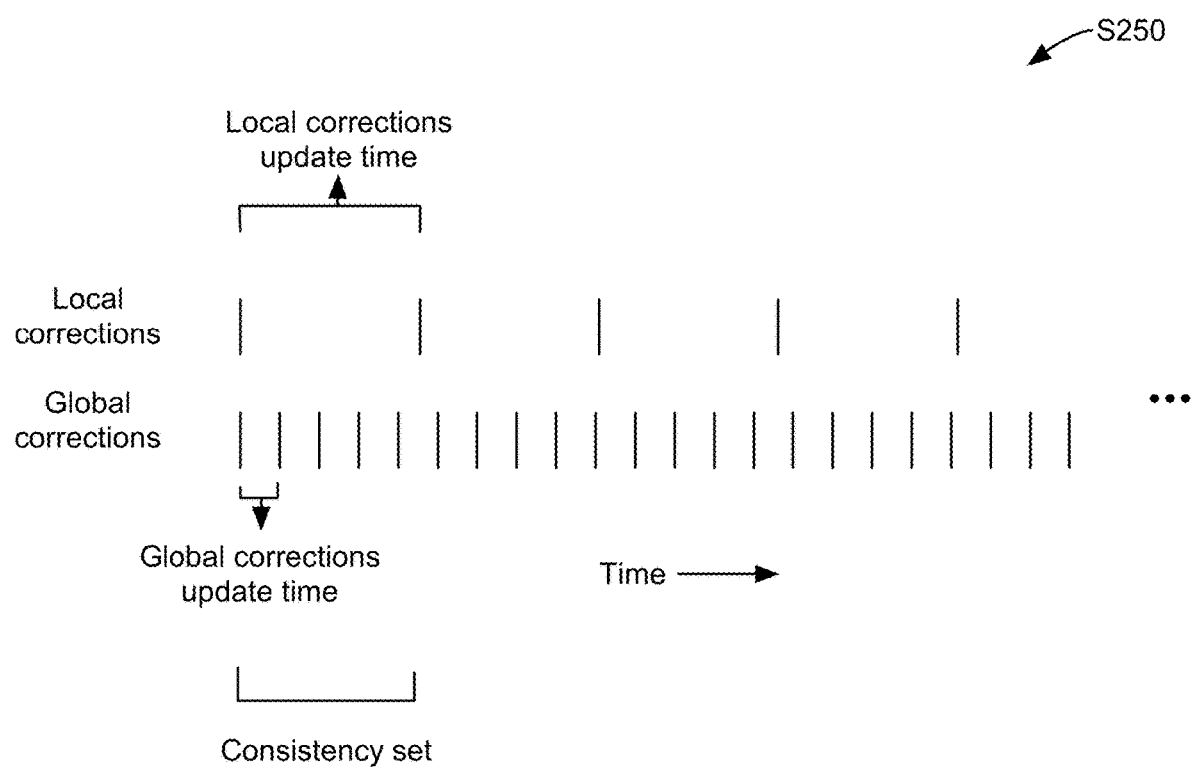
FIG. 6 is a schematic representation of an example of data (e.g., correction) updates.

In variants, different portions of the GNSS corrections can be updated at different frequencies. In a first illustrative example, as shown in FIG. 6, spatially invariant corrections can be updated at a first frequency and spatially variant corrections can be updated at a second frequency, where the first frequency is greater than the second frequency. In a second illustrative example, ionospheric delays can be updated at a first frequency and tropospheric delays can be updated at a second frequency, where the first frequency is greater than the second frequency. In a third illustrative example, satellite clock corrections can be updated at a first frequency and satellite orbit corrections can be updated at a second frequency, where the first frequency is greater than the second frequency. However, the first frequency can be less than or equal to the second frequency.

In variants, the set of corrections can include a consistency set, where corrections of the consistency set can be used together for determining the receiver position. The consistency sets are preferably defined based on a time duration, but can be defined based on a correction generation method, an application, a receiver, and/or otherwise be defined. The time duration can be the update frequency, the shortest update frequency of a subset of the corrections, the longest update frequency of a subset of the corrections, a predetermined time (e.g., 1 s, 2 s, 5 s, 10 s, 14 s, 30 s, 45 s, 60 s, 2 min, 5 min, 10 min, 30 min, 45 min, 60 min, 90 min, 120 min, 3 hrs., 6 hrs., 12 hrs., 24 hrs., etc.; based on a receiver property such as speed, position, etc.; based on an application; etc.), a number of satellite observations (e.g., after a predetermined number of satellite observations have been received, processed, etc.), and/or other suitable time. Using corrections corresponding to different consistency sets can generate an incorrect receiver position and/or can increase the amount of time it takes for the receiver position determination to converge. However, using corrections corresponding to different consistency sets can converge in less than or an equal amount of time and/or can generate an receiver position with the same or greater accuracy as using corrections corresponding to the same consistency set. In an illustrative example as shown in FIG. 6, a consistency set can include (e.g., correspond to) all corrections generated between updates to a spatially variant correction. In this illustrative example, each update to a spatially invariant correction is included in the consistency set (e.g., as the spatially invariant correction is updated, the spatially invariant correction is updated and included within the consistency set). In this illustrative example, the consistency set can be incomplete (e.g., does not include spatially invariant corrections) when the spatially variant corrections are updated, until another update to the spatially invariant corrections. However, the consistency set can be referenced to a spatially invariant correction, a subset of the spatially variant corrections (e.g., updates to an ionospheric delay, updates to a tropospheric delay, etc.), a predetermined time (e.g., absolute time, relative time), and/or be otherwise defined or referenced.

The GNSS corrections are preferably associated with (e.g., include) metadata. The metadata functions to provide information about the GNSS corrections to facilitate their storage, transmission, and/or use in determining a receiver position.

In variants, the metadata can include a correction region (e.g., location, area), a correction type (e.g., spatially invariant correction such as satellite orbit error, satellite clock error, satellite bias, code bias, phase bias, pseudorange bias, etc.; spatially variant corrections such as ionosphere delay, troposphere delay, ionosphere gradient, etc.; etc.), a correction format, a tag (e.g., an identifier such as for update time, most recent update, consistency set, timestamp, epoch identifier, serial identifier, version number, etc.), secure information, signatures (e.g., from the correction supplier), data integrity indicators, information relating how to interpret the corrections (or corrections data), and/or any suitable information. The tag is preferably serially incremented for each successive correction for a given correction region-correction type combination (e.g., indicating which correction for the given correction region-correction type combination is most recent), but can or be otherwise determined. In one example, different "clock" corrections for different correction regions can have the same tag value. In a second example, a "clock" and an "ionosphere" correction for the same correction region can have the same tag value.

The metadata is preferably in a different format from the corrections format (e.g., HTTP/1, gPRC, TCP, etc.), but can be in the same format. The metadata can be included in: a header, wrapper, appended to the correction, or otherwise packaged with the correction.

In variants, the computing system can include a correction generator (e.g., a correction module), a gateway, a storage module, a distribution module, a positioning module, and/or any suitable module(s). Each module can be associated with an entity generating corrections, an entity operating the GNSS receiver(s), a distribution entity, a third party, and/or any suitable entity. In an illustrative example, a correction generator, a gateway, a storage module, and a distribution module can be hosted on a cloud or remote server separate from a computing system (e.g., a GNSS receiver computing system) hosting the positioning module. However, the correction generator, gateway, storage module, distribution module, and/or positioning module can be distributed between one or more local and one or more remote computing systems in any manner (e.g., all be hosted on the same computing system).

The correction generator preferably functions to generate the GNSS corrections (and/or the metadata). The correction generator can additionally or alternatively validate the GNSS corrections and/or otherwise function. The correction generator preferably generates the GNSS corrections using the reference station satellite observations, but can generate the GNSS corrections based on GNSS receiver satellite observations, sensor data, logged data (e.g., weather data, data retrieved from a database, etc.) and/or any data. The correction generator can generate the GNSS corrections according to a model, using machine learning, using a Kalman filter, using a Gaussian process (e.g., as disclosed in as disclosed in U.S. patent application Ser. No. 16/983,706 titled "SYSTEM AND METHOD FOR GAUSSIAN PROCESS ENHANCED GNSS CORRECTIONS GENERATION" filed 3 Aug. 2020 incorporated in its entirety by this reference), and/or otherwise generate the GNSS corrections. In examples, the corrections can be determined (e.g., generated) and/or validated as disclosed in U.S. patent application Ser. No. 16/589,932 titled 'SYSTEMS AND METHODS FOR DISTRIBUTED DENSE NETWORK PROCESSING OF SATELLITE POSITIONING DATA' filed 1 Oct. 2019 or U.S. patent application Ser. No. 16/865,077 titled 'Systems and Methods for High-Integrity Satellite Positioning' filed 1 May 2020, each of which is incorporated in its entirety by this reference.

The corrections data can include continuous corrections (e.g., a function, a surface, a volume, a manifold, etc.), discrete corrections (e.g., associated with one or more grid points or other discrete locations), and/or have any suitable form. In an illustrative example as shown for example in FIGS. 8A-8F, a correction (e.g., an atmospheric correction) can include (e.g., be represented by) a continuous correction (e.g., a fitting function such as a polynomial fitting function to a model of the atmospheric delays and/or electron counts) and a set of discrete corrections (e.g., grid points such as associated with a residual of a fit of the continuous corrections to an exact or modelled correction value). The corrections (e.g., corrections data) can be any suitable corrections as disclosed in U.S. patent application Ser. No. 17/374,523 titled "SYSTEM AND METHOD FOR DETERMINING GNSS POSITIONING CORRECTIONS" filed 13 Jul. 2021, which is incorporated in its entirety by this reference. However, the corrections can have any suitable representation.

The gateway functions to receive (e.g., transmit, route, etc.) the GNSS corrections (and/or subsets thereof) from the correction generator (e.g., via a request, subscribed stream, API, etc.). The gateway can be hosted by a third party separate from the correction generator, can be hosted by the same party as the correction generator, and/or can be otherwise hosted. The gateway can be connected to the storage module, distribution module, and/or other module. The gateway can distribute the GNSS corrections based on the metadata, receiver data, storage module information, distribution module information, and/or any suitable information.

The storage module preferably functions to store the GNSS corrections (or subsets thereof). The storage modules can correspond to long-term (e.g., permanent) memory or short-term (e.g., transient) memory. Examples of storage modules include caches 365, buffers, databases, look-up tables, RAM, ROM, and/or any type of memory. The storage modules preferably only store the most recently determined (e.g., updated) GNSS corrections, but can store one or more previous GNSS corrections and/or any GNSS corrections. In an illustrative example, GNSS corrections (and/or subsets thereof) can be transmitted to (e.g., routed to) the storage module after they have been updated. However, any GNSS corrections (or subsets thereof) can be transmitted to the storage module(s).

In variants including more than one storage module, each storage module can be associated with a receiver, a receiver entity, a corrections service entity, a GNSS correction region, a correction region-correction type combination, a GNSS corrections format, a GNSS correction type, a correction tag, and/or be associated with any entity and/or data.

The distribution module preferably functions to distribute (e.g., transmit) GNSS corrections to the GNSS receiver(s) and/or a third party operator (such as an operator of the GNSS receivers). The distribution module can additionally or alternatively convert the GNSS corrections to a format usable (e.g., readable by) the GNSS receiver and/or any other functions. For example, the distribution module can receive (or determine) a corrections format from the GNSS receiver and can transmit (or process to convert and transmit) corrections in the corrections format to the GNSS receiver. The distribution module is preferably in communication with the storage module, but can be in communication with the corrections generator (e.g., to indicate a format to generate or convert the corrections to), the gateway, the GNSS receiver, and/or any module(s) and/or component(s). The GNSS corrections can be distributed automatically or manually. The GNSS corrections can be distributed at a predetermined frequency (e.g., an update frequency, a satellite observation detection frequency, etc.), at predetermined times (e.g., every 1 s, 2 s, 5 s, 10 s, 30 s, 1 min, 2 min, 5 min, 10 min, 30 min, 1 hr, 2 hrs., 4 hrs., 6 hrs., 12 hrs., 24 hrs., etc.), responsive to a trigger (e.g., a call for GNSS corrections, updated GNSS corrections, etc.), in response to GNSS correction receipt (e.g., at the gateway, at the storage module), in response to GNSS correction publication (e.g., from the storage module, from the gateway, from the message broker, etc.), and/or with any timing. The distribution module can include a communication module. The communication module can be a long-range (e.g., internet, cellular, satellite communication, radio, fiber optic, etc.) and/or a short-range (e.g., Bluetooth, optical, etc.) communication module.

The distribution module preferably distributes the GNSS corrections based on the metadata. In a first specific example, as shown in FIG. 4, the GNSS corrections can be distributed based on a receiver locality, where the receiver locality can be the approximate (e.g., within approximately 1° latitude and/or 1° longitude of the actual, within approximately 500 km of the actual, etc.) position of the receiver, a geographic region that the receiver is intended to be used in, a geographic region associated with a third party user or operator of the receiver, and/or any suitable locality. The receiver locality preferably uniquely corresponds to or is associated with a geographic region (e.g., tile), but can correspond to or be associated with a plurality of geographic regions and/or any suitable geographic region(s). The receiver locality can be a coordinate, a GNSS correction region, a geocode, and/or be otherwise formatted. A receiver locality can be associated with one or more correction regions (e.g., correction regions encompassing all or a portion of the receiver locality, within a predetermined distance of the receiver locality, pre-associated with the receiver locality, geographic regions, area(s), etc.). For instance, receiver A in FIG. 4 can receive GNSS corrections corresponding to the red, green, yellow, and/or purple regions; receiver B in FIG. 4 can receive GNSS corrections corresponding to the red region; receiver C in FIG. 4 can receive GNSS corrections corresponding to the green and/or purple regions; receiver D in FIG. 4 can receive GNSS corrections corresponding to the yellow region; and receiver E in FIG. 4 does not receive any GNSS corrections. In a second illustrative example, the GNSS corrections can be distributed based on the format of the GNSS corrections that can be interpreted by the GNSS receiver. In a third illustrative example, only updated GNSS corrections (e.g., as determined by the tag and/or timestamp) can be transmitted. However, the GNSS corrections can be distributed in any manner.

The receiver locality can be determined from (or based on) a nearest cellular tower, cellular tower trilateration, a WIFI signal, the last known receiver position, a satellite connection (e.g., satellite network), computer vision (e.g., to identify objects in the environment of the receiver), user input, reference station signal (e.g., a nearest reference station), a transponder signal, a previous receiver position (e.g., determined from a previous iteration of the method, receiver position calculated from the satellite observations without convergence, receiver position calculated from the satellite observations without validation, receiver position calculated from the satellite observations such as using pseudorange to calculate an approximate receiver location, receiver position determined prior to an outage, etc.), receiver position estimated based on dead reckoning, and/or can be otherwise determined.

In variants, the distribution module can distribute subsets of the GNSS corrections (e.g., different correction types) at different frequencies. For example, the spatially invariant corrections can be distributed at or near a first frequency and the spatially variant corrections can be distributed at or near a second frequency. In an illustrative example, the distribution module can only distribute subsets of the GNSS corrections that have been updated. In a second illustrative example, the distribution module can distribute GNSS corrections only when a consistency set is complete (e.g., includes local and spatially invariant corrections). However, the distribution module can distribute any GNSS corrections (or subset thereof) with any timing.

In variants, the distribution module can include (and/or be) a message oriented middleware such as a message broker 385 or a message queue. In related variants, the distribution module can include a translator, which functions to convert or modify the format of the GNSS corrections. The message broker can be generic, specific to a correction type, specific to a correction region, and/or otherwise specialized. In a specific example, the distribution module can handle direct receiver communication (e.g., retrieve corrections from the cache, push data from the message broker to the receiver), while the message broker can publish the most recent corrections for all correction regions and/or correction types from the cache (e.g., for one or more distribution modules' consumption).

The positioning module preferably functions to determine the receiver position. The receiver position is preferably determined to a high accuracy (e.g., less than about 1 mm, 5 mm, 1 cm, 2 cm, 5 cm, 1 dm, 2 dm, 5 dm, 1 m, 2 m, 5 m, etc.) and/or to a high integrity (e.g., total integrity risk $<10^{-4}$, $<10^{-5}$, $<10^{-6}$, $<10^{-7}$, $<10^{-8}$, $<10^{-9}$, $<10^{-10}$/hr, etc.); however, the receiver position can be determined to any accuracy and/or integrity. In examples, the position module can calculate the receiver position and/or otherwise operate as a 'position module' as disclosed in U.S. patent application Ser. No. 16/865,077 titled 'Systems and Methods for High-Integrity Satellite Positioning' filed 1 May 2020. However, the positioning module can be otherwise configured.

4. Method.

The method preferably functions to generate and/or disseminate data (e.g., a set of corrections), where the corrections can be used to estimate (e.g., calculate, determine) the receiver position. Steps and/or substeps of the method can be performed iteratively (e.g., for different epochs, for the same epoch, etc.), sequentially, and/or in any suitable order. The steps and/or substeps of the method can be performed in series and/or in parallel. The steps and/or substeps are preferably performed by a system as described above, but can be performed by any system.

Receiving the satellite observations S100 functions to measure and/or detect a set of satellite signals, where each satellite signal is associated with a satellite, at a reference station and/or a receiver. Satellite signals corresponding to the same set of satellites are preferably received at the GNSS receiver(s) and the reference station(s); however, the GNSS receiver(s) and the reference station(s) can receive satellite signals from any satellites. The satellite signals can include satellite code, satellite pseudorange, carrier phase, and/or any suitable data. Receiving the satellite observations can include transmitting the satellite observations to the computing system (e.g., a remote computing system, a corrections generator, etc.), to the GNSS receiver, and/or to any suitable endpoint. Receiving the satellite observations can optionally include monitoring the satellite observations for one or more predetermined event (e.g., fault, outlier, etc.).

Determining GNSS corrections S200 functions to determine a set of GNSS corrections that can be used to estimate a receiver position and/or correct the set of satellite observations. The GNSS corrections are preferably determined by a computing system (e.g., a correction generator of a computing system), but can be determined by any suitable component. The corrections are preferably determined based on satellite observations made at one or more reference stations, but can be made based on any suitable data set. The satellite observations preferably correspond to (e.g., include observations from) one or more satellite positioning constellations, but can correspond to an auxiliary satellite constellation and/or any satellites. Determining the GNSS corrections can include: determining spatially variant corrections, determining spatially invariant corrections, validating the GNSS corrections, and/or any steps.

The GNSS corrections are preferably determined (e.g., independently determined for) for different geographic locations (e.g., a plurality of spatial regions that cover a geographic region such as a city, county, parish, state, country, continent, ocean, sea, lake, etc.), but can be determined over a geographic region, at reference points, at reference lines, and/or be determined for any region. For example, different GNSS corrections of the set of GNSS corrections can be determined or validated for each geographic region. However, the GNSS corrections can additionally or alternatively be validated in a given geographic region, be globally determined, and/or otherwise be determined or validated.

In a first variant, the GNSS corrections can be determined in a single format. In these variants, the GNSS correction format can be modified and/or changed to another format for example using a translator or data broker. In a related variant, the GNSS receiver can transmit a corrections format to the computing system, where the GNSS corrections are determined in that corrections format (e.g., correction data of the GNSS corrections can be determined in the corrections format, where the correction data can be converted to another format). In a second variant, the GNSS corrections can be determined in a plurality of formats (e.g., correction data of the GNSS corrections can be determined in a plurality of formats). However, the GNSS corrections can be determined in any format.

The GNSS corrections can be determined based on pierce points, pierce angles, models, machine learning (e.g., neural networks), and/or in any manner. In some variants, the atmosphere can be divided into one or more shells (e.g., 2 thin shells, 3 thin shells, 5 thin shells, any suitable number of shells between about 1 and 20, greater than 20 thin shells, etc.) where each shell can be modeled to determine corrections (dependent or independent of other shells).

In a first specific example, at least one of ionospheric or tropospheric effects can be modelled as a function of least one of a pierce point or a pierce angle for satellite rays for each satellite of the set of satellites (e.g., a line of sight vector between a receiver such as a mobile receiver, a reference station, etc. and each satellite). In a first variation of the first specific example, ionospheric effects for each of the set of satellites can be modelled as a function of pierce point and pierce angle for lines of sight between the mobile receiver and each of the set of satellites. In a second variation of the first specific example, tropospheric effects for each of the set of satellites can be modelled as a function of pierce point (e.g., where a static correction for pierce angle for lines of sight between the mobile receiver and each of the set of satellites can be used).

In a second specific example, at least one of ionospheric or tropospheric effects can be modelled using a Gaussian process (e.g., using undifferenced satellite observations, using single differenced satellite observations, using double differenced satellite observations, etc. such as where the Gaussian process does not include differencing satellite observations). In a variation of the second specific example, a covariance function relating a first pierce point associated with a first satellite observation and a second pierce point associated with a second satellite observation comprises a squared exponential function. However, any suitable covariance function can be used.

In a third specific example, the GNSS corrections can be determined (and/or validated) as disclosed in U.S. patent application Ser. No. 16/983,706 titled "SYSTEM AND METHOD FOR GAUSSIAN PROCESS ENHANCED GNSS CORRECTIONS GENERATION" filed 3 Aug. 2020, U.S. application Ser. No. 16/817,196 titled "SYSTEMS AND METHODS FOR REAL TIME KINEMATIC SATELLITE POSITIONING" filed 12 Mar. 2020, U.S. application Ser. No. 16/865,077 titled SYSTEMS AND METHODS FOR HIGH-INTEGRITY SATELLITE POSITIONING" filed 1 May 2020, and/or U.S. application Ser. No. 16/589,932 titled "SYSTEMS AND METHODS FOR DISTRIBUTED DENSE NETWORK PROCESSING OF SATELLITE POSITIONING DATA" filed 1 Oct. 2019, each of which is incorporated its entirety by this reference, or otherwise be determined or validated. The first, second, and third specific examples can be combined in any manner (e.g., pierce points and/or angles can be used as inputs to a Gaussian process) and/or used in isolation.

Determining GNSS corrections can additionally include attaching metadata to the correction. The metadata can be included internal to (e.g., appended to) or external from the corrections data. The metadata preferably includes the GNSS corrections format, the GNSS corrections type, the GNSS correction region, and a tag. However, the metadata can additionally or alternatively include any suitable data (e.g., as described above). The metadata is preferably generated concurrently with determining the GNSS corrections, but can be generated at any time relative to the GNSS corrections. The metadata can be determined based on the correction model, from the corrections data, be predefined, and/or be otherwise determined.

Figure 5A:
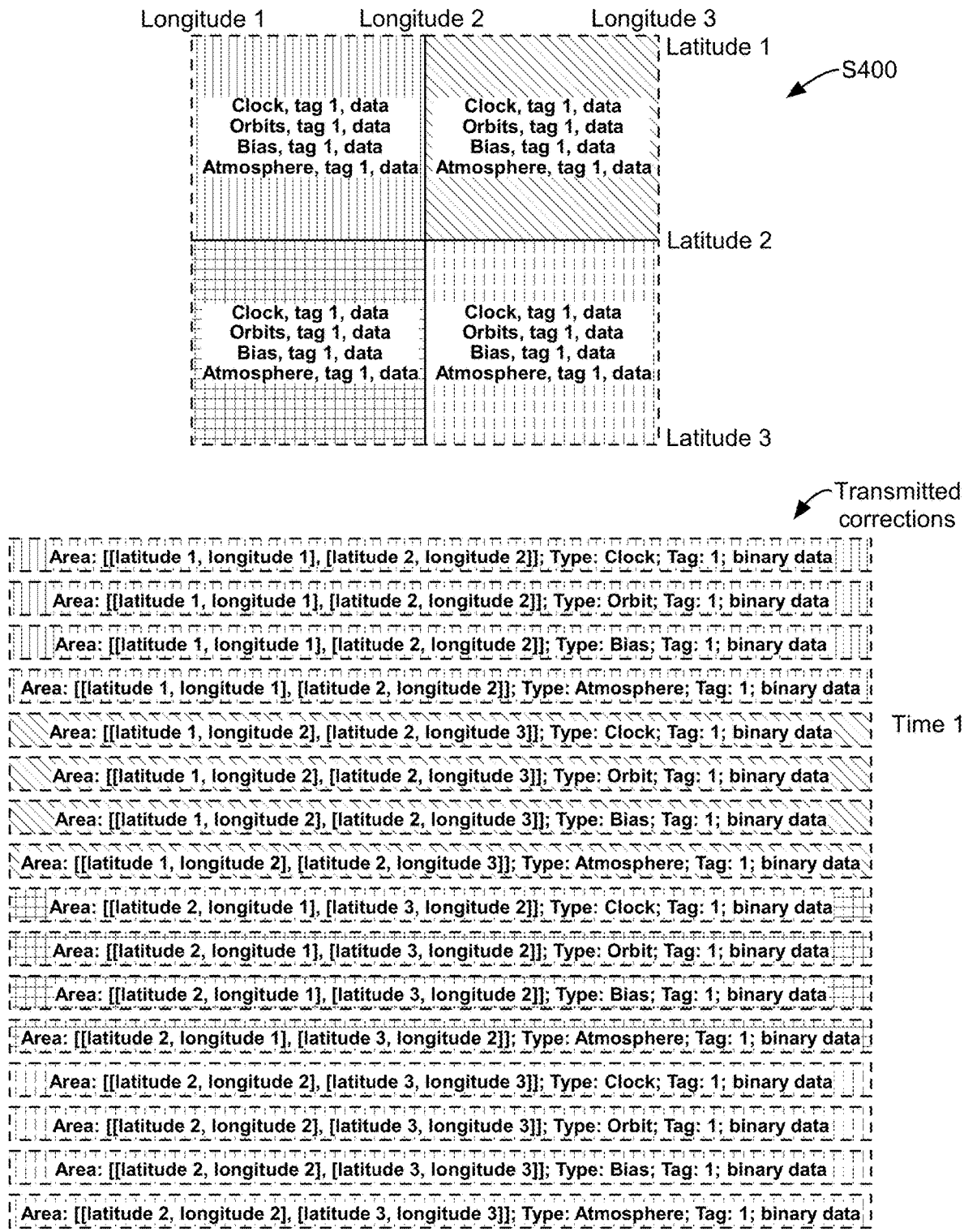
FIGURE 5A is a schematic representation of an example of transmitted corrections at a first time.
Figure 5B:
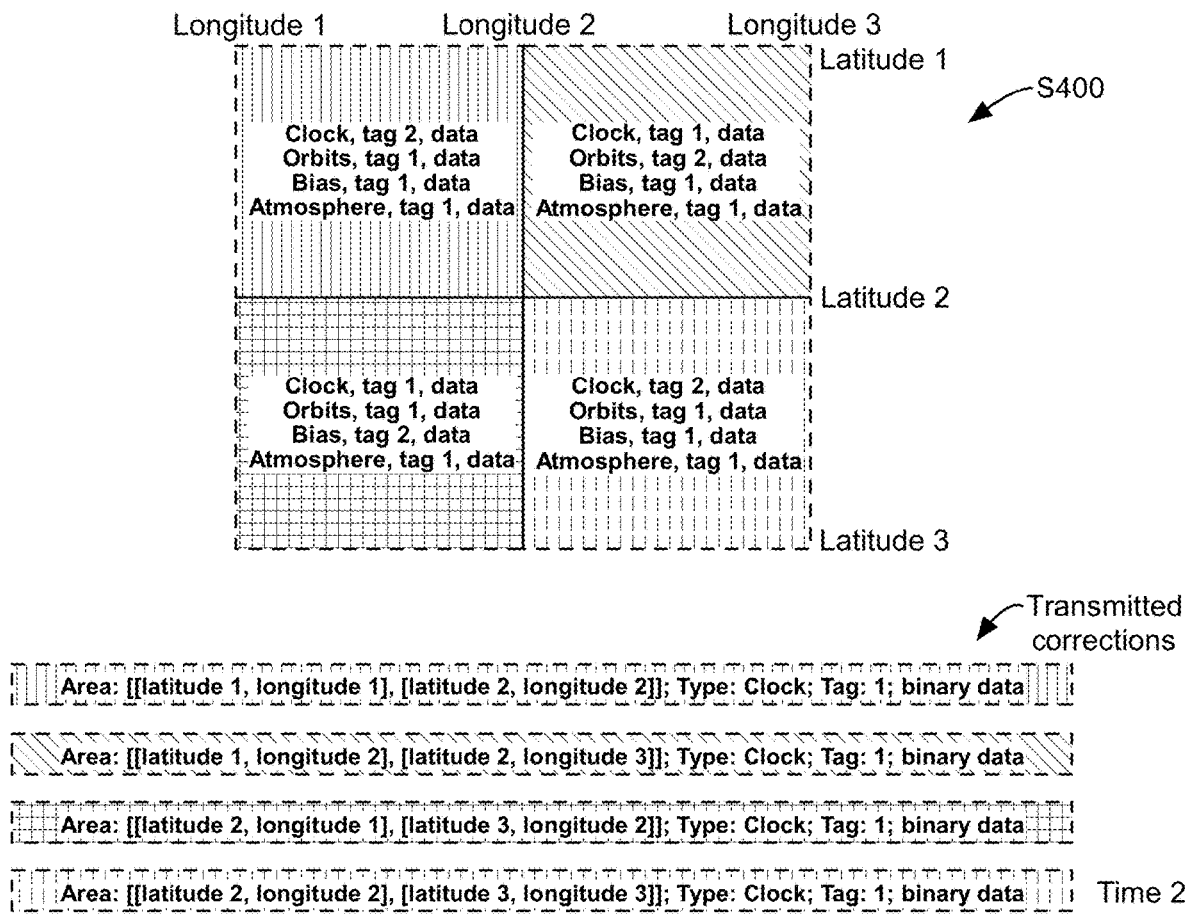
FIG. 5B is a schematic representation of an example of transmitted corrections at a second time, after the first time of FIG. 5A, where a subset of the corrections has been modified.

Generating the metadata preferably includes modifying (e.g., incrementing) the metadata (e.g., the tag value) associated with the GNSS correction. The tag value (and/or other metadata) is preferably modified every time the corrections data is updated (e.g., recalculated). However, the tag (and/or other metadata) can be updated when corrections data associated with a consistency set is modified, when the corrections data changes, after a predetermined number of corrections data updates, at predetermined times, and/or with any timing. For example, as shown in FIGS. 5A and 5B, each time a GNSS correction (such as the atmospheric correction, clock, orbit, bias, etc.) is updated, the tag value can be increased by 1. However, the tag can be otherwise modified.

S200 can include updating the GNSS corrections S250. The GNSS corrections can be updated (e.g., redetermined such as according to S200 using new data, using a different analysis or generation method, etc.) at predetermined times (e.g., before, during, and/or after an epoch), at a predetermined frequency, responsive to a trigger (e.g., a call for updated GNSS corrections, acquisition of new data, acquisition of a predetermined amount of new data, a new satellite entering line of sight of a receiver or reference station, a satellite leaving line of sight of a receiver or reference station, etc.), and/or with any suitable timing. The GNSS corrections are preferably updated in the same manner as they are determined (e.g., as described above), but can be updated in a different manner (e.g., using a different process, using different covariance functions relating the data within a Gaussian process, etc.).

S200 can include validating the GNSS corrections. However, the GNSS corrections can be independently validated, not be validated, and/or have any suitable validity. For example, the GNSS corrections can be validated by comparing corrections generated using a first set of satellite observations and a second set of satellite observations (e.g., where each set can be independently used to determine satellite corrections and those satellite corrections compared to validate the GNSS corrections). However, the GNSS corrections can be validated based on a model (e.g., the validity of the model), comparison to other data (e.g., comparison to weather data, based on a receiver position determined using the corrections, etc.), and/or otherwise be validated.

Storing the GNSS corrections S300 functions to cache the GNSS corrections for subsequent retrieval. The GNSS corrections are preferably received from a separate system or party (e.g., a corrections generator), but can be received from a common system or party and/or any suitable source. The GNSS corrections are preferably stored by a third party (e.g., a vehicle fleet manager, an OEM, a memory module thereof, etc.), but can be stored by the corrections generator (and/or memory module or other module of a computing system hosting the corrections generator), the receiver, and/or other system.

The GNSS corrections are preferably stored based on (e.g., according to) the metadata, but can be stored in any manner. In an illustrative example, when the tag (e.g., cache key) has changed, the GNSS corrections are cached, and when the tag has not changed, the GNSS corrections are not cached. In a related example, when the tag associated with a consistency set changes, the GNSS corrections associated with the consistency set can be cached (e.g., whether or not the tag associated with the subset of GNSS corrections has changed). The GNSS corrections are preferably stored in one or more storage modules (e.g., of the computing system), but can be stored at any suitable component. In a specific example, storing the GNSS corrections includes caching the GNSS corrections.

Only updated (e.g., most recent, new, etc.) GNSS corrections (or subsets thereof) are preferably stored. However, one or more previous GNSS corrections (or subset thereof) can be stored. The updated GNSS corrections can be identified based on the metadata (e.g., tag), a timestamp, a change in the GNSS corrections, and/or in any manner. Identifying the updated GNSS corrections is preferably performed by a gateway, but can be performed by the storage module, the distribution module, a GNSS receiver, a third party computing system, and/or any suitable component.

Transmitting the GNSS corrections S400 functions to transmit the GNSS corrections to the GNSS receiver. S400 is preferably performed by a distribution module, but can be performed by any suitable module and/or system. Only the GNSS corrections corresponding to the receiver locality (e.g., an approximate receiver position such as accurate to within about 1 km, 10 km, 100 km, 1000 km, etc.) are preferably transmitted. For example, only corrections where an area associated with the corrections that matches (e.g., the receiver locality is within the area or geographic region as shown for example in FIG. 4; the receiver locality is within a threshold distance such as 100 m, 500 m, 1 km, 2 km, 5 km, 10 km, 50 km, 100 km, etc. of the area or geographic region; etc.) the receiver locality can be transmitted. However, additionally or alternatively, GNSS corrections corresponding to regions adjacent to the receiver locality can be transmitted (e.g., to act as a buffer such as in case connectivity between the receiver and computing system is lost, because a receiver locality uncertainty straddles two or more geographic regions, etc.) and/or any corrections can be transmitted. The GNSS corrections are preferably transmitted in a format that is readable by (or otherwise interpretable by) the GNSS receiver. However, additionally or alternatively, the distribution module can provide instructions for how to modify the GNSS corrections format, can reformat the GNSS corrections so that they are readable by the GNSS receiver, the receiver can change the GNSS corrections format, and/or the GNSS corrections can be otherwise formatted. The GNSS corrections format can be determined based on the metadata (e.g., a format signifier), the corrections data, and/or can otherwise be determined. The GNSS corrections are preferably transmitted from the computing system (e.g., a distribution module of the computing system) to the receiver, but can be transmitted between any two endpoints (e.g., to a third party computing system). All or a subset of GNSS corrections corresponding to each receiver locality can be transmitted.

The GNSS corrections can be transmitted automatically, semi-automatically (e.g., responsive to a trigger such as an update to a correction, an update to a correction associated with the receiver locality, a request for current and/or updated corrections, based on a change in a receiver locality, etc.), and/or manually (e.g., responsive to a user input). The GNSS corrections can be transmitted at predetermined times (e.g., every 1 s, 2 s, 5 s, 10 s, 20 s, 30 s, 45 s, 60 s, 2 min, 3 min, 5 min, 10 min, 20 min, 30 min, 45 min, 60 min, etc.), based on a receiver locality (e.g., when the receiver locality crosses a boundary between GNSS corrections, when a receiver locality changes by at least a threshold distance, etc.), when the GNSS corrections are updated (e.g., when a new correction has been determined), when the set of satellites changes (e.g., when a new satellite comes into the line of view of the receiver, when a new satellite is in the line-of-view of the reference station, when a satellite leaves the line-of-view of the receiver, when a satellite leaves the line-of-view of the reference station, etc.), and/or with any timing.

The GNSS corrections (e.g., corrections data, metadata, etc.) are preferably transmitted in an opaque manner (e.g., encrypted, as binary data, in a format that can only be interpreted by a computing system configured to read the GNSS corrections, etc.), which can be beneficial for preventing unauthorized users from accessing or using the GNSS corrections, for preventing illegitimate GNSS corrections (e.g., supplied by bad actors to imitate the actual data) from being used or provided, and/or can otherwise be beneficial. However, the GNSS corrections can be provided as plain text, in an unobscured or not opaque manner, and/or otherwise be provided.

The GNSS corrections can be transmitted in the same or different messages (e.g., a different message for each correction, a different message for each consistency set, a different message for each geographical region, etc.). The GNSS corrections can be transmitted in any order. For example, spatially invariant corrections can be provided before spatially variant corrections, spatially variant corrections can be transmitted before spatially invariant corrections, each correction can be transmitted in a predetermined order (e.g., clocks before orbits before atmospheric corrections; orbits before clocks before atmospheric corrections; clocks before atmospheric corrections before orbits; orbits before atmospheric corrections before clocks; atmospheric corrections before clocks before orbits; atmospheric corrections before orbits before clocks; etc.), and/or corrections can be provided in any order.

The GNSS corrections data is preferably transmitted to the GNSS receiver (and/or third party) in a format (e.g., representation) that the third party and/or GNSS receiver can determine the corrections. However, the corrections data for the receiver locality or position can be transmitted (e.g., the corrections values such as predicted delays; rather than a model, fit, grid points, or other representation of the corrections values; can be transmitted) and/or the corrections data can be transmitted in any manner. The GNSS corrections can include instructions for how to process and/or interpret the GNSS corrections data (e.g., the format the data is in, how to convert between formats, etc.).

In variants, when the GNSS corrections include discrete corrections (e.g., grid points), the discrete corrections associated with a region can be transmitted in a raster order (e.g., as shown for example in FIG. 8A), in a boustrophedonic pattern (e.g., as shown for example in FIG. 8B), in a spiral pattern (e.g., as shown for example in FIGS. 8C and 8E), according to a space filling curve (e.g., a Hilbert curve, Peano curve, as shown for example in FIGS. 8D and 8F, etc.), and/or in any suitable manner. The pattern can be (e.g., can traverse, can start, etc.) latitudinally, longitudinally, diagonally, vertically, aligned to a cardinal or subcardinal direction, horizontally, and/or in any suitable direction. The pattern can be specified in the metadata, can be predetermined, can be fixed (e.g., always transmitted in a predetermined manner), can be requested by the GNSS receiver (and/or third party associated therewith), and/or can otherwise be determined or identified by the GNSS receiver and/or third party.

Geographic regions (e.g., correction regions) are preferably associated with between 3-1000 (such as 3, 4, 5, 6, 8, 10, 15, 20, 25, 30, 40, 50, 100, 150, 200, 300, 400, 500, 1000, values therebetween, etc.) discrete corrections (such as grid points), less than 3 discrete corrections (e.g., 0 grid points, 1 grid point, 2 grid points), greater than 1000 discrete corrections, and/or any suitable number of grid points or other discrete corrections. The discrete corrections are preferably separated by between about 10-1000 km such as 50 km, 100 km, 200 km, 500 km, 750 km. In an illustrative example, discrete corrections can be spaced by about 1° latitude and/or 1° longitude (e.g., between adjacent or nearest neighboring discrete corrections). However, the discrete corrections can be separated by less than 10 km, more than 1000 km, 0.01°-10° latitude or longitude, less than 0.01° latitude or longitude, greater than 10° latitude or longitude, and/or by any suitable distance.

In variants, such as when the receiver locality corresponds to a plurality of GNSS corrections, each GNSS correction of the plurality of GNSS corrections, the GNSS corrections corresponding to the previous region that the receiver was in, the GNSS corrections corresponding to a new region that the receiver is in, the most recent (e.g., most recently updated) GNSS corrections, interpolated GNSS corrections (e.g., interpolated between all or a subset of the plurality of regions, interpolated between a plurality of discrete corrections, etc.), and/or any suitable GNSS corrections can be transmitted.

Figure 7A:
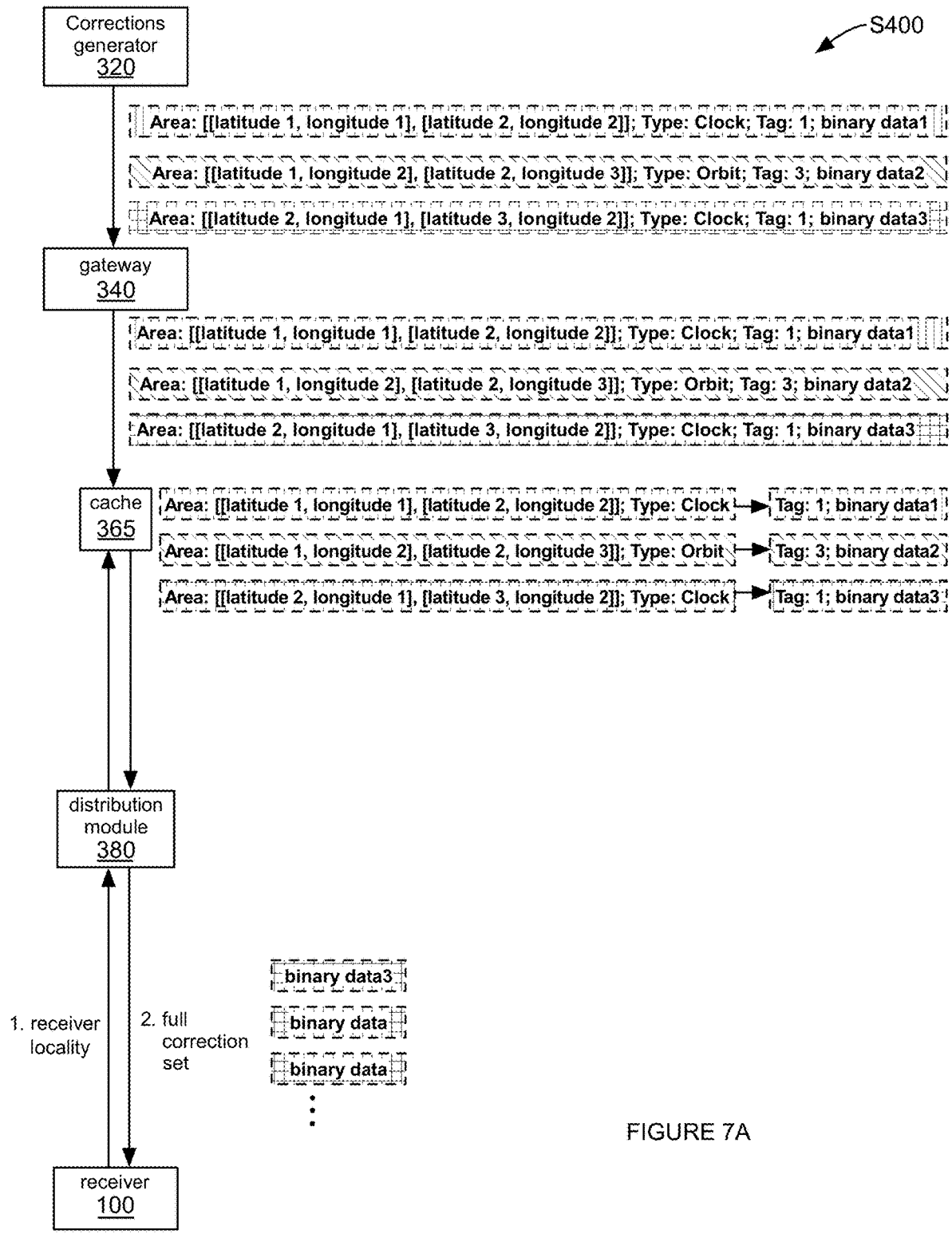
FIGS. 7A and 7B are schematic representations of an example of data (e.g., correction) provision at a first and second time, respectively.

In a first variant, as shown for example in FIGS. 5A and 7A, transmitting the GNSS corrections can include transmitting the full GNSS corrections set. The full GNSS correction set is preferably transmitted when the consistency set has been updated, but can additionally or alternatively be transmitted at the initialization of the method, when a receiver locality changes (e.g., when a receiver enters a new correction region), after a loss in corrections signal (e.g., a connection between the receiver and a remote computing system is recovered), when a receiver position and/or residual determined using the GNSS corrections exceeds a threshold, when the set of satellites and/or reference stations changes, responsive to a request for the full corrections set, and/or at any time.

Figure 7B:
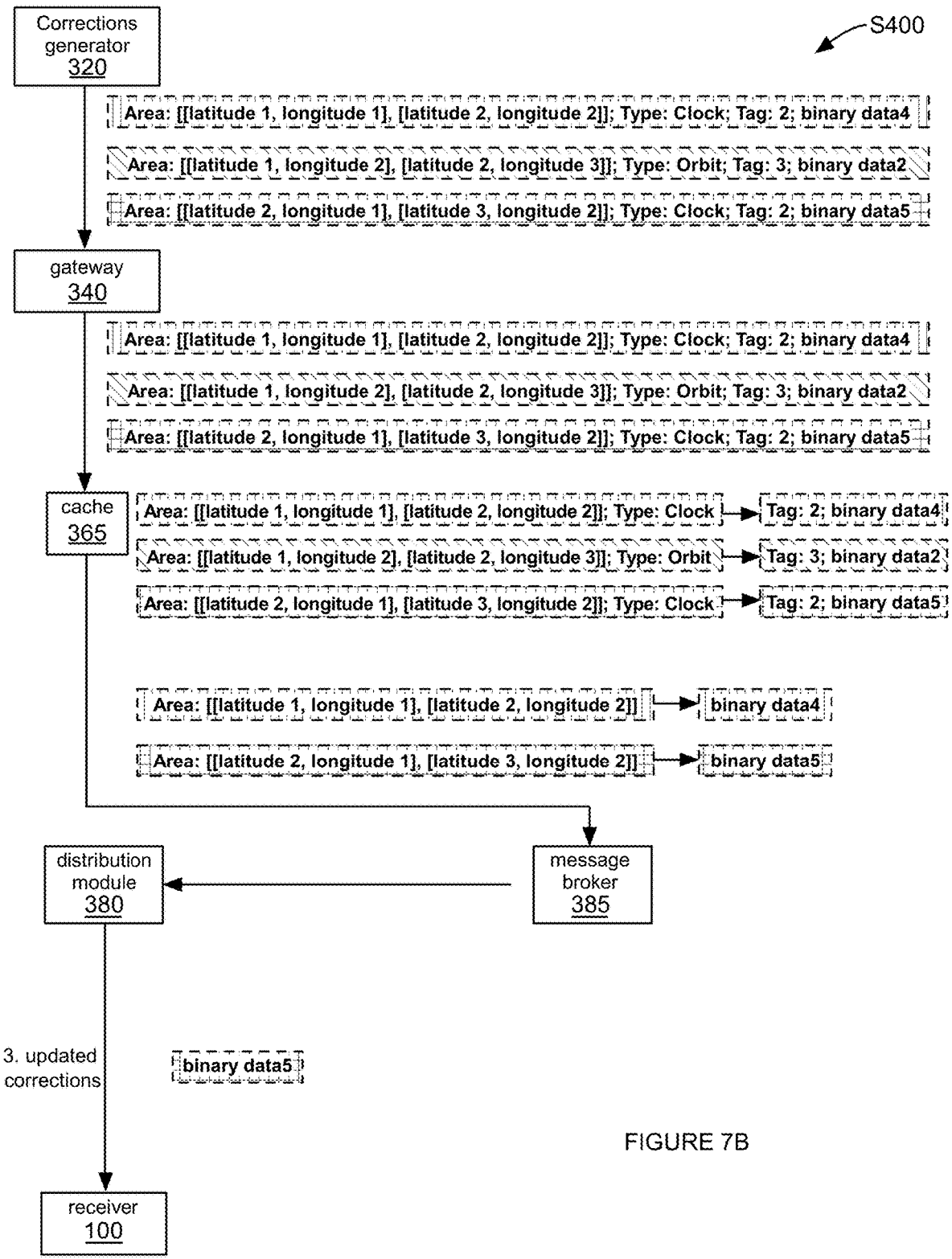
Figure 8A:
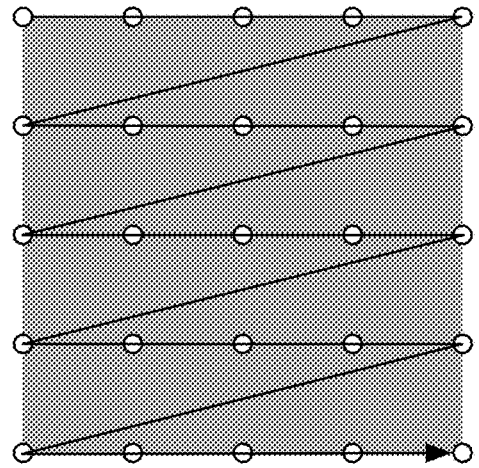
FIGS. 8A-8F are schematic representations of example paths for transmitting discrete or point based data (e.g., corrections).
Figure 8B:
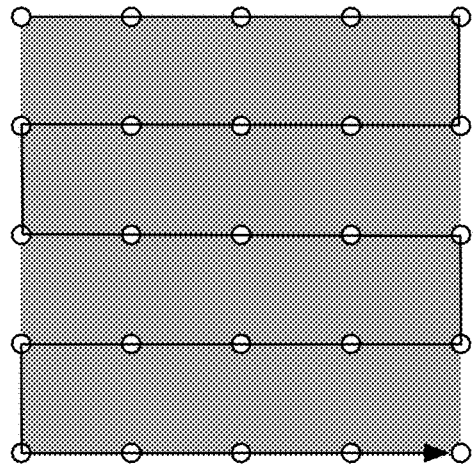
Figure 8C:
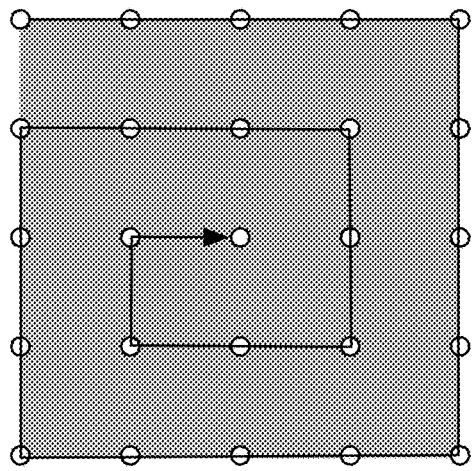
Figure 8D:
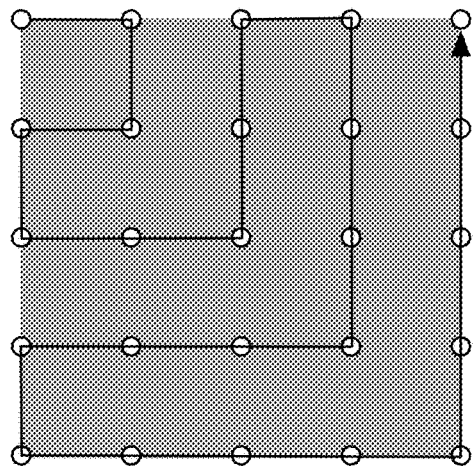
Figure 8E:
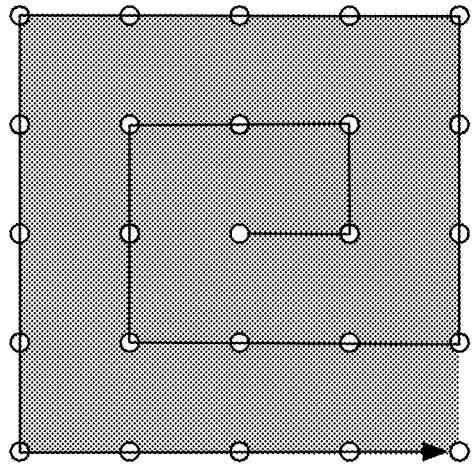
Figure 8F:
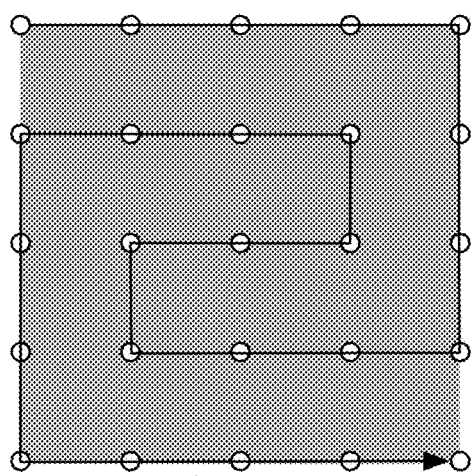

In a second variant, as shown for example in FIGS. 5B and 7B, transmitting the GNSS corrections can include transmitting a subset of GNSS corrections. The subset of GNSS corrections preferably corresponds to individual GNSS corrections that have been updated (e.g., since the full GNSS corrections were transmitted, since the most recent GNSS corrections were transmitted, since a consistency set of GNSS corrections were determined, etc.). However, any GNSS corrections (or subsets thereof) can be transmitted. The updated GNSS corrections can be determined as described above and/or in any manner. The subset of GNSS corrections are preferably transmitted after (e.g., immediately after such as within a threshold time after the GNSS correction update) the GNSS corrections have been updated (e.g., when a tag value changes), but can be transmitted when the consistency set is updated, at predetermined times (for example, after the predetermined time has elapsed, the GNSS corrections can be checked to determine whether any corrections have been updated or modified), responsive to a request for updated corrections, and/or with any timing.

In some variations of S400, only a subset of the GNSS corrections can be transmitted. The subset of GNSS corrections can be transmitted subject to one or more constraints (e.g., satellite constraints, satellite constellation constraints, corrections constraints, etc.). Corrections that meet the condition of the constraint can be excluded from transmission and/or corrections that do not meet the condition of the constraint can be excluded from transmission. Examples of constraints include: jurisdictional constraints, validity or integrity constraints, temporal constraints (e.g., a threshold amount of time passed since the last fault associated with a data source, a threshold amount of time that a satellite has been in view, etc.), numerical constraints (e.g., a maximum number of satellites, a minimum number of satellites, a maximum number of corrections per satellite, a minimum number of corrections per satellite, etc.), and/or any suitable constraints. In a first example, when a GNSS receiver (and/or third party or managing entity) is located in Japan (e.g., receiver locality is determined to be in Japan), corrections associated with satellites from the Beidou satellite constellation may not be transmitted to the GNSS receiver (and/or third party) or vice versa (e.g., GNSS receivers with a locality in China may not receive corrections associated with QZSS satellites). In a second example, only spatially invariant or spatially variant corrections can be transmitted to the GNSS receiver (or third party). In a third example, only corrections data can be transmitted (e.g., metadata or other data associated with the GNSS corrections is not transmitted). However, any suitable subset of the GNSS corrections (or each correction thereof) can be transmitted.

S400 can include transmitting auxiliary data, where the auxiliary data can be used to facilitate the determination of the receiver position or locality, facilitate the operation of an external system, and/or otherwise be used. The auxiliary data can be transmitted at the same frequency and/or time as the GNSS corrections and/or be transmitted at a different frequency and/or time. For instance, the auxiliary data can be transmitted once (e.g., once per consistency set, at a first iteration of the method, etc.). However, the auxiliary data can be transmitted based on a change in the auxiliary data, based on a change in an environmental condition of the GNSS receiver (e.g., a change in the time of day, change in weather, etc.), and/or be transmitted at any suitable time. However, the auxiliary data can be transmitted with any suitable frequency. Auxiliary data can be static and/or variable. Examples of auxiliary data include: landmarks (e.g., visual odometry landmarks such as pixels, super pixels, pixel blocks, visual features, etc.; locality landmarks such as buildings, streets, maps, etc.; etc.), weather forecasts and/or data (e.g., almanac data), and/or any suitable auxiliary data.

Determining the receiver position S500 functions to determine the receiver position to high accuracy (e.g., receiver position is known to within 1 mm, 2 mm, 5 mm, 1 cm, 2 cm, 5 cm, 1 dm, 2 dm, 5 dm, 1 m, 2 m, 5 m, 1 dam, etc.) and/or with high integrity (e.g., total integrity risk $\leq 1\times 10^{-4}$/hr, $\leq 1\times 10^{-5}$/hr, $\leq 1\times 10^{-6}$/hr, $\leq 1\times 10^{-7}$/hr, $\leq 1\times 10^{-8}$/hr, etc.). The receiver position is preferably determined by the computing system (e.g., positioning module such as of the GNSS receiver), but can be determined by the computing system and/or any component. Determining the receiver position can include: determining a carrier phase ambiguity, calculating the receiver position based on the carrier phase ambiguity, determining a baseline vector between a receiver and a reference station, determining an absolute receiver position (e.g., by applying the baseline vector to the reference station location), and/or any steps.

Determining the receiver position can include correcting the set of satellite observations based on the GNSS corrections which can function to decrease and/or remove the impact of errors on the satellite observations. The GNSS corrections is preferably the full set of corrections (e.g., includes a correction for each correction type), but can alternatively be a subset thereof. The full set of corrections are preferably the most recent corrections for each respective correction type (e.g., can have different tag values for each correction type), but can alternatively be the most recent consistency set (e.g., have the same tag value; be the highest or most recent tag value with all correction types received by the receiver) or be any other suitable correction set. Correcting the set of satellite observations can include subtracting the GNSS corrections and the satellite observations, adding the GNSS corrections to the satellite observations, transforming the satellite observations based on the GNSS corrections, and/or otherwise use the GNSS corrections to correct the set of satellite observations.

In variants, the receiver position and/or protection level can be transmitted to an external system, stored (e.g., cached), used to operate and/or control an external system, can be used to determine operation instructions for an external system (e.g., at a processor of an external system), and/or used in any manner.

Figure 3:
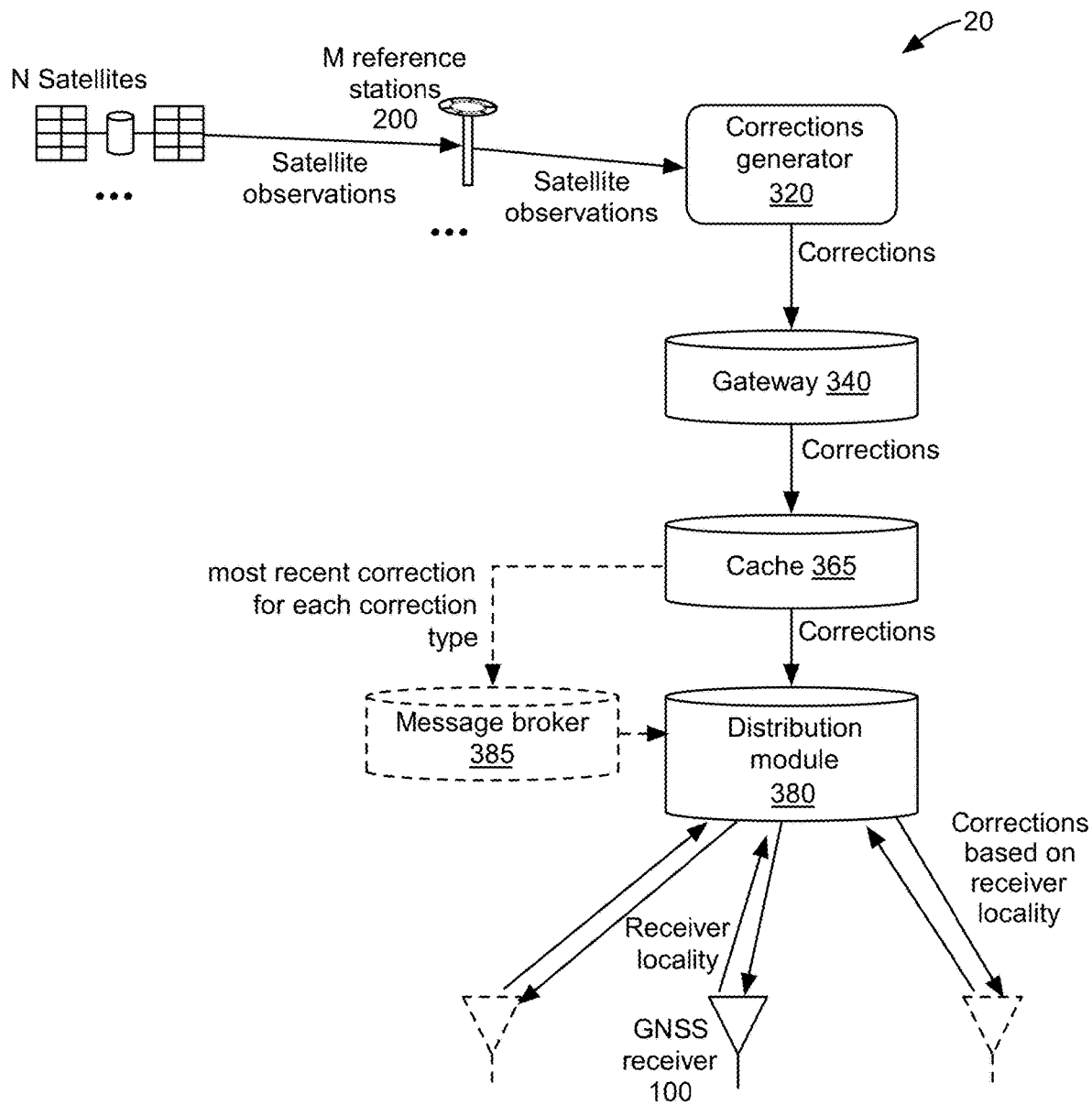
FIG. 3 is a schematic representation of an example of the system.

In an illustrative example as shown in FIG. 3, a system for providing GNSS corrections to a GNSS receiver can include: a set of reference stations configured to receive satellite observations corresponding to one or more satellites associated with one or more satellite constellations; a correction generator configured to determine GNSS corrections based on the satellite observations, where the GNSS corrections include spatially invariant corrections data, spatially variant corrections data, and where each piece of correction data is associated with metadata that can include a GNSS correction format, a GNSS correction type, an index (e.g., a tag) associated with a consistency set, and location (e.g., an area that the corrections are determined over or valid for); a gateway configured to store the GNSS corrections at a storage module and update stored GNSS corrections as updated GNSS corrections are generated; a distribution module configured to transmit the GNSS corrections to one or more GNSS receivers (or a third party that hosts, operates, or otherwise interfaces with the GNSS receivers), where the GNSS corrections are transmitted in a format readable by the GNSS receiver, and where the GNSS corrections are transmitted based on a locality of the GNSS receiver; and a positioning module configured to determine a receiver position (e.g., using the GNSS corrections).

In a second illustrative example, a method can include: receiving a stream of correction data associated with: a correction region, a correction type, a serial identifier (e.g., tag), and the correction data from a remote service (e.g., SSR service, corrections generator, etc.); caching the most recent corrections data using the correction region and correction type combination as a data cache key, the serial identifier as the data cache value, and the correction as the data; receiving a request from a receiver for corrections for a receiver locality; retrieving a full correction set, including the most recent corrections for each correction type, associated with the correction region(s) encompassing the receiver locality; sending the retrieved corrections to the receiver; while the receiver is associated with (e.g., located within) the geolocation, serially updating the receiver with the most recent correction data as the correction data is received at the cache; and repeating the method from full correction set retrieval in response to receiver location within a new locality. In a third example, the method includes providing a system configured to execute the second illustrative example. In a fourth example, the method includes receiving corrections data from a system configured to execute the second illustrative example or using the second illustrative example.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for distributing corrections to a GNSS receiver comprising:
   a corrections generator configured to generate a set of corrections based on satellite observations associated with a set of satellites measured at a set of reference stations, wherein each correction of the set of corrections comprises:
   an area associated with the correction;
   a tag; and
   correction data;
   a gateway configured to:
   receive the set of corrections; and
   update a set of stored corrections with the set of received corrections based on a tag associated with each correction of the set of stored corrections and the tag associated with each correction of the set of received corrections; and
   a distribution module configured to:
   connect to a GNSS receiver;
   determine a locality of the GNSS receiver; and
   transmit stored corrections of the set of stored corrections to the GNSS receiver when the area associated with the stored corrections matches the locality of the GNSS receiver;
   wherein correction data for a correction of the set of corrections comprises atmospheric corrections, wherein the atmospheric corrections are determined by modelling atmospheric effects as a function of at least one of a pierce point or a pierce angle for satellite rays for each satellite of the set of satellites.

2. The system of claim 1, wherein the correction data for a correction of the set of corrections comprises state space representation data.

3. The system of claim 1, wherein the atmospheric corrections are determined using a Gaussian process.

4. The system of claim 1, wherein the set of corrections comprises discrete corrections arranged on a grid and continuous corrections.

5. The system of claim 4, wherein the discrete corrections associated with the area are transmitted in a raster order.

6. The system of claim 1, wherein the corrections generator is further configured to update correction of the set of corrections, wherein a tag associated with a correction of the set of corrections is modified when the correction is updated.

7. The system of claim 1, wherein the area is an approximately five degree latitude by an approximately five degree longitude geographic region.

8. The system of claim 1, wherein the set of corrections comprise a correction for at least one of: ionosphere delays, troposphere delays, satellite clock error states, satellite orbit error states, code biases, or phase biases.

9. The system of claim 1, wherein the distribution module is further configured to transmit visual odometry landmarks within the area to the GNSS receiver.

10. A method for distributing corrections to a GNSS receiver comprising:
    generating a set of corrections based on satellite observations associated with a set of satellites measured at a set of reference stations, wherein each correction of the set of corrections comprises:
    an area associated with the correction;
    a tag; and
    correction data;
    updating a stored correction of a set of stored corrections with a correction of the set of generated corrections based on a tag associated with the stored correction and the tag associated with the correction of the set of generated corrections;
determining a locality of the GNSS receiver; and
transmitting stored corrections of the set of stored corrections to the GNSS receiver when the area associated with the stored corrections matches the locality of the GNSS receiver;
wherein generating the set of corrections comprises modelling atmospheric effects as a function of at least one of a pierce point or a pierce angle for satellite rays for each satellite of the set of satellites.

11. The method of claim 10, wherein the correction data for a correction of the set of corrections comprises state space representation data.

12. The method of claim 10, wherein the atmospheric corrections are modelled using a Gaussian process.

13. The system of claim 10, wherein the set of corrections comprises discrete corrections arranged on a grid and continuous corrections.

14. The system of claim 13, wherein the discrete corrections associated with the area are transmitted in a raster order.

15. The method of claim 10, further comprising updating a correction of the set of corrections, wherein the tag associated with the correction is modified when the correction is updated.

16. The method of claim 10, wherein the area is an approximately five degree latitude by an approximately five degree longitude geographic region.

17. The method of claim 10, wherein the set of corrections comprise a correction for at least one of: ionosphere delays, troposphere delays, satellite clock error states, satellite orbit error states, code biases, or phase biases.

18. The method of claim 10, wherein transmitting stored corrections comprises transmitting visual odometry landmarks within the area to the GNSS receiver.

* * * * *

UNITED STATES PATENT AND TRADEMARK OFFICE
CERTIFICATE OF CORRECTION

| | | |
|---|---|---|
| PATENT NO. | : 11,624,838 B2 | |
| APPLICATION NO. | : 17/379271 | |
| DATED | : April 11, 2023 | |
| INVENTOR(S) | : Mark Fine, Benjamin Segal and Fergus Noble | |

It is certified that error appears in the above-identified patent and that said Letters Patent is hereby corrected as shown below:

On the Title Page

Page 3, Column 1, Item (56) Other Publications, Line 15, Delete "PCT/US20/44750dated" and insert --PCT/US20/44750 dated-- therefor In the Claims Column 19, Line 17, In Claim 13, delete "system" and insert --method-- therefor Column 20, Line 1, In Claim 14, delete "system" and insert --method-- therefor Signed and Sealed this
Sixth Day of June, 2023

Katherine Kelly Vidal
*Director of the United States Patent and Trademark Office*